(12) United States Patent
Moss et al.

(10) Patent No.: US 7,751,186 B2
(45) Date of Patent: Jul. 6, 2010

(54) CHASSIS HAVING A BYPASS CHANNEL FOR AIR FLOW

(75) Inventors: David L. Moss, Austin, TX (US); Paul T. Artman, Austin, TX (US); William Coxe, Round Rock, TX (US); Shawn P. Hoss, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/926,890

(22) Filed: Oct. 29, 2007

(65) Prior Publication Data

US 2009/0109612 A1 Apr. 30, 2009

(51) Int. Cl.
- H05K 7/20 (2006.01)
- H05K 5/00 (2006.01)
- G06F 1/20 (2006.01)

(52) U.S. Cl. .............. 361/679.49; 361/679.48; 361/679.51; 361/690; 361/694; 361/695; 312/223.2; 312/236; 454/184

(58) Field of Classification Search ............ 361/679.46, 361/679.48–679.51, 690, 692, 694–695; 165/80.3; 174/16.1; 312/223.2, 236; 454/184
See application file for complete search history.

(56) References Cited

U.S. PATENT DOCUMENTS

| | | | |
|---|---|---|---|
| 6,094,345 A * | 7/2000 | Diemunsch | 361/695 |
| 6,778,386 B2 | 8/2004 | Garnett et al. | |
| 6,924,977 B2 | 8/2005 | Bestwick et al. | |
| 6,927,975 B2 | 8/2005 | Crippen et al. | |
| 6,980,435 B2 * | 12/2005 | Shum et al. | 361/695 |
| 7,012,815 B2 * | 3/2006 | Garnett et al. | 361/825 |
| 7,068,505 B2 * | 6/2006 | Kosugi | 361/690 |
| 7,079,395 B2 * | 7/2006 | Garnett et al. | 361/715 |
| 7,248,472 B2 * | 7/2007 | Vinson et al. | 361/694 |
| 7,259,961 B2 * | 8/2007 | Lucero et al. | 361/695 |
| 7,333,330 B2 * | 2/2008 | McEwan | 361/679.48 |
| 7,508,663 B2 * | 3/2009 | Coglitore | 361/695 |
| 2005/0168945 A1 * | 8/2005 | Coglitore | 361/695 |
| 2006/0023422 A1 * | 2/2006 | Shum et al. | 361/695 |

* cited by examiner

*Primary Examiner*—Jayprakash N Gandhi
*Assistant Examiner*—Robert J Hoffberg
(74) *Attorney, Agent, or Firm*—Baker Botts L.L.P.

(57) ABSTRACT

A chassis having a bypass channel for air flow is disclosed. The chassis include a bypass channel that is proximate one side of the chassis. The bypass channel may be formed by the side of the chassis and a module of the computing system, such as the processor module of the computing system. A second module exists in the rear of the chassis. A physical barrier may be used to direct air from the bypass channel to the second module, which may be an I/O module. A plenum is placed on the opposite side of I/O module from the air flow. The presence of the plenum creates a negative pressure on the opposite side of the second module, causing air to cross the second module into the plenum. A fan in the rear of the chassis causes air to leave the plenum and exit the chassis.

19 Claims, 2 Drawing Sheets

CHASSIS HAVING A BYPASS CHANNEL FOR AIR FLOW

TECHNICAL FIELD

The present disclosure relates generally to computer systems and information handling systems, and, more particularly, to a chassis having a bypass channel for air flow.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The physical frame of an information handling system is known as the chassis. A computer system generates heat within the interior of the chassis of the computer system. Once source of heat within a computer system is the processor or processor of the computer system. Excessive heat may result in degradation in the performance of a computer system. In addition, if multiple computer systems are included in a data center, excessive heat may result in high cooling costs for the data center. A chassis may include a fan for directing air through the interior of the chassis.

Blade servers typically include a chassis that is characterized as being long, wide, and flat. In this configuration, the processor modules may be located at the front of the computer system and the I/O modules of the computer system may be located at the rear of the computer system. If a fan is included in the rear of the computer system, the fan will draw air into the chassis at the front of the chassis. As a result, unheated air will pass across and cool the processor modules of the chassis. Once the air reaches the I/O modules, however, the air is heated.

SUMMARY

In accordance with the present disclosure, a chassis having a bypass channel for air flow is disclosed. The chassis include a bypass channel that is proximate one side of the chassis. The bypass channel may be formed by the side of the chassis and a module of the computing system, such as the processor module of the computing system. A second module exists in the rear of the chassis. A physical barrier may be used to direct air from the bypass channel to the second module, which may be an I/O module. A plenum is placed on the opposite side of I/O module from the air flow. The presence of the plenum creates a negative pressure on the opposite side of the second module, causing air to cross the second module into the plenum. A fan in the rear of the chassis causes air to leave the plenum and exit the chassis.

The chassis design disclosed herein is technically advantageous because it provides a design in which unheated air is allowed to reach a module in the rear or back portion of the chassis. The unheated air travels through the bypass channel and reaches the rear module and reaches the rear module before it is heated by the processor module near the front of the chassis. The chassis design disclosed herein is also advantageous in that it provides for the uniform air flow across the module in the rear of the channel. The placement of barriers within the interior of the chassis directs unheated air to one side of the module in the rear of the chassis. The placement of a plenum causing a negative pressure on the opposite side causes air to flow in a generally uniform manner across the second module, there by providing a uniform flow of unheated air across the volume of the second module. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
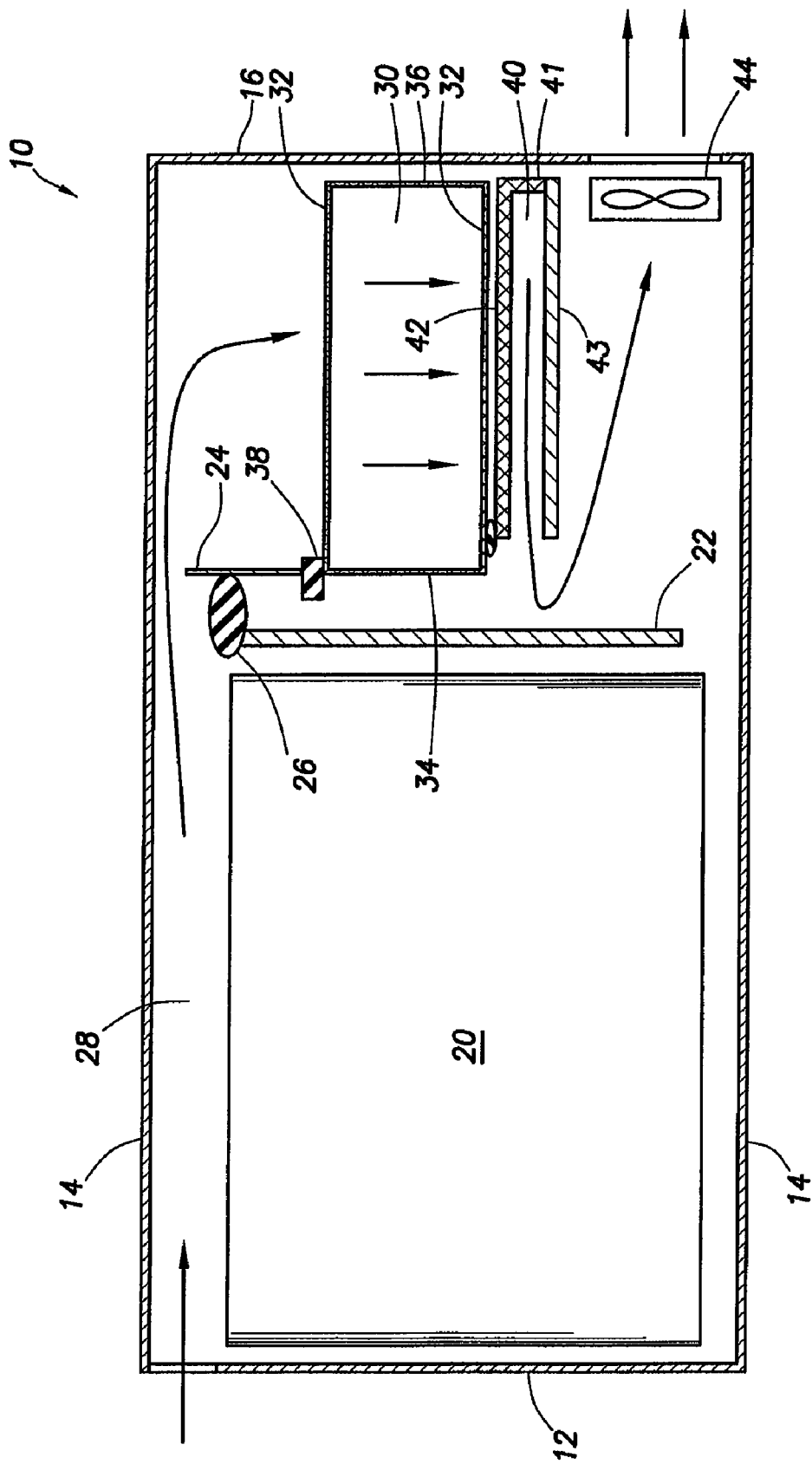
FIG. 1 is a top view of a chassis.

Shown in FIG. 1 is a top view of a chassis 10. A chassis 10 has a front side or front face 12, two lengthwise sides 14, and a rear side or rear face 16. Within the chassis is a processor module 20, which houses the processors of the computer system. Adjacent processor module 20 is a transverse partition 22, which is generally parallel to the front side 12 and rear side 16 of the chassis. Transverse partition is placed between processor module 20 and rear side 16 of the chassis. In the chassis of FIG. 1, the direction that is defined as the direction between the front side 12 and the rear side 16 is known as lengthwise direction. The direction that is defined as the direction between the two sides 14 is known as the transverse direction. Also included in chassis 10 is a side partition 24, which, like transverse partition 22, is generally parallel to the front side 12 and rear side 24. Side partition 24 is between transverse partition 22 and rear side 16 of the chassis. A seal 26 is in place between transverse partition 22 and side partition 24. Seal 26 prevents air from flowing in the transverse direction between transverse partition 22 and side partition 24. A bypass air channel 28 is formed in the space between processor module 20 and one side 14. As a result of the positioning of processor module 20, transverse partition 22, side partition 24, and seal 26, air flows lengthwise between processor module 20 and one side of the chassis. As indicated by the arrows in FIG. 1, the air flows between side partition 24 and the side of the chassis.

Chassis 10 includes an I/O module 30. I/O module 30 includes a number of vents in the sides 32 of the I/O module 30 that permit air to flow in a transverse direction across and through the module 30. I/O module 30 also includes a front 34 and a rear 36, which are solid and prevent the flow of air therethrough. A seal 38 may be placed between a side 32 of the I/O module and the side partition to prevent air from flowing between the side 32 of the I/O module and the side partition and reaching the air in front of the front 34 of the I/O module. As shown by the arrows in FIG. 1, air flows from bypass channel 28 into the interior of I/O module 30.

As shown by the arrows in FIG. 1, air exits I/O module 30 and into a channel 40 formed by the sides of a lengthwise plenum channel 41. Plenum channel 41 is formed by a pair of walls, a vented wall 42 and a solid wall 43. Walls 42 and 43 are generally parallel to the adjacent side 32 of the I/O module. Also included in chassis 10 is fan 44. Fan 44 is oriented to blow air out the rear of chassis 10. The activation of fan 44, combined with the placement of walls 42 and 43 parallel to and near I/O module 30 creates a negative pressure plenum in the space between plenum walls 42 and 43. The negative pressure plenum draws air across the I/O module 30 and into the plenum channel 41 between plenum walls 42 and 43. The air that is drawn across I/O module 30 is unheated, as this air passes through bypass channel 28 and does not pass over or through processor module 20. In addition, the orientation of plenum walls 42 and 43 in a configuration that is generally perpendicular or normal to the direction of air flow through I/O module 30 results in an unheated air flow that is generally uniform across the volume of I/O module 30. After entering the negative pressure plenum, the heated air exits the negative air pressure plenum in the direction of the arrows shown in FIG. 1 and exits the chassis through fan 44.

Figure 2:
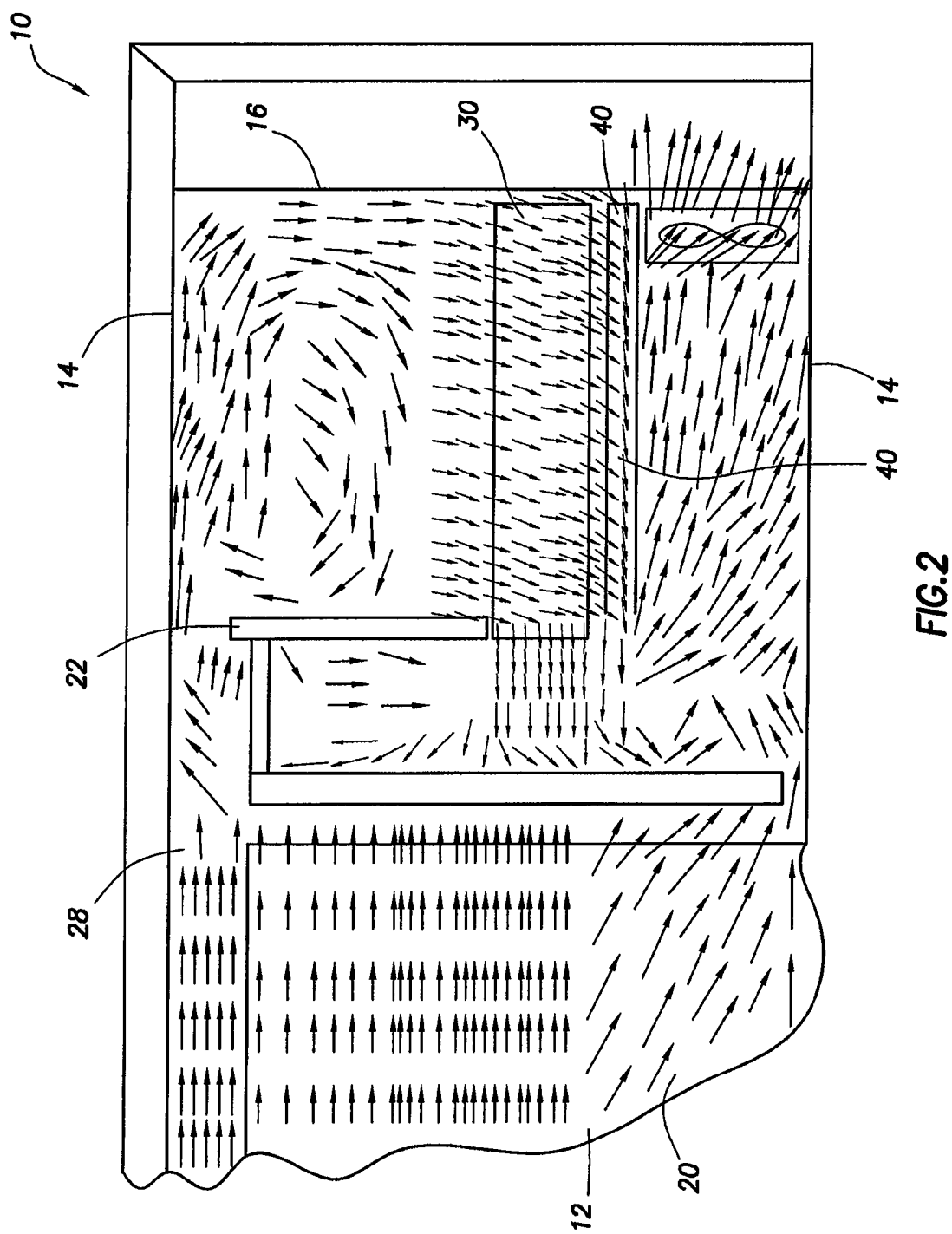
FIG. 2 is a diagram depicting the air flows within the interior of the chassis of FIG. 1.

Shown in FIG. 2 is a diagram depicting the air flows within the interior of the chassis. The numerous arrows in FIG. 2 depict the direction of air flow. As indicated in FIG. 2, the activation of the fan causes air to be drawn through the bypass channel and across the I/O module. The plenum on the opposite side of the I/O module causes a negative pressure area that draws air across the I/O module. The fan draws heated air out of the plenum and expels the heated air from the interior of the chassis.

The chassis design shown herein is advantageous in that it provides a bypass for the delivery of unheated air to the I/O module of a computer system. In this manner, the I/O module can be efficiently cooled through the delivery of unheated air. In addition, the provision of a negative pressure channel that draws air across the I/O module results in the even and generally uniform distribution of air across the entire volume of the I/O module. The chassis design disclosed herein also includes a number of seals to insure that the unheated air of the bypass channel is directed through the I/O module before being allowed to exit the chassis through the fan of the chassis.

The chassis design disclosed herein is not limited in its application to blade chassis having a height of 2 U or less. Instead, the chassis design disclosed herein may be used with any chassis that includes a rear component that needs to be air cooled with air that is drawn through the entire length of the chassis. Although the present disclosure has been described in detail, it should be understood that various changes, substitutions, and alterations can be made hereto without departing from the spirit and the scope of the invention as defined by the appended claims.

What is claimed is:

1. A chassis for a computing system, comprising:
a front face;
a rear face;
a first side and a second side, wherein each of the first side and the second side are coupled to the front face and the rear face;
a first module proximate the front face, wherein the distance between the first module and the first side forms a bypass channel;
a second module proximate the rear of the channel, wherein the second module (i) is permeable so as to permit the transfer of air from a direction of one of the first side and second side therethrough and (ii) prevents the transfer of air from a direction of one of the front face and the rear face therethrough;
a plenum channel proximate the second module, wherein the plenum channel is formed of at least a first wall and a second wall, and wherein the first wall is permeable so as to permit the transfer of air therethrough and the second wall is solid so as to prevent the transfer of air therethrough, and wherein the first wall and the second wall are aligned substantially parallel to one another; and
a fan positioned downstream of the plenum channel, wherein when the fan is activated, unheated air is drawn through the bypass channel and across the second module and wherein the activation of the fan causes negative pressure to exist in the plenum channel, causing air to flow across the second module and into the plenum channel.

2. The chassis of claim 1, wherein the activation of the fans expels heated air from the second module from the interior of the chassis.

3. The chassis of claim 1, wherein the first module is a processor module.

4. The chassis of claim 1, wherein the second module is an I/O module.

5. The chassis of claim 1, wherein the chassis includes a barrier positioned between the first module and the second module to prevent air from exiting the chassis without passing through the second module.

6. The chassis of claim 1, wherein the activation of the fan causes heated air to be received at the plenum channel.

7. The chassis of claim 6, wherein the first module is a processor module.

8. The chassis of claim 6, wherein the second module is an I/O module.

9. The chassis of claim 1, wherein the first wall and the second wall are coupled by a third wall.

10. A method for ventilating the interior of a chassis, comprising:
provide a chassis, wherein the chassis comprises,
a front face;
a rear face;
a first side and a second side, wherein each of the first side and the second side are coupled to the front face and the rear face;
a first module proximate the front face, wherein the distance between the first module and the first side forms a bypass channel; and
a second module proximate the rear of the channel, wherein the second module (i) is permeable so as to permit the transfer of air from a direction of one of the first side and the second side therethrough and (ii) prevents the transfer of air from a direction of one of the front and the rear face therethrough;
a plenum channel proximate the second module, wherein the plenum channel is formed of at least a first wall and a second wall, and wherein the first wall is permeable so as to permit the transfer of air therethrough and the second wall is solid so as to prevent the transfer of air therethrough, and wherein the first wall and the second wall are aligned substantially parallel to one another; and
activating a fan positioned downstream of the plenum channel, wherein the activation of a fan causes unheated air to be drawn through the bypass channel and across the second module and wherein the activation of the fan causes negative pressure to exist in the plenum channel, causing air to flow across the second module and into the plenum channel.

11. The method for ventilating the interior of a chassis of claim 10, wherein the step of activating a fan causes heated air from the second module to be expelled from the interior of the chassis.

12. The method for ventilating the interior of a chassis of claim 10, wherein the first module is a processor module.

13. The method for ventilating the interior of a chassis of claim 10, wherein the second module is an I/O module.

14. The method for ventilating the interior of a chassis of claim 10, wherein the first wall and the second wall are coupled by a third wall.

15. The method for ventilating the interior of a chassis of claim 10, wherein the chassis includes a barrier positioned between the first module and the second module to prevent air from exiting the chassis without passing through the second module.

16. A chassis for a computing system, comprising:
a front face;
a rear face;
a first side and a second side, wherein each of the first side and the second side are coupled the front face and the rear face;
a processor module proximate the front face, wherein the distance between the processor module and the first side forms a bypass channel;
an I/O module proximate the rear of the channel, wherein the I/O module (i) is permeable so as to permit the transfer of air from a direction of one of the first and second sides therethrough and (ii) prevents the transfer of air from a direction of one of the front and the rear face therethrough;
a plenum channel proximate the I/O module, wherein the plenum channel is formed of at least a first wall and a second wall, and wherein the first wall is permeable so as to permit the transfer of air therethrough and the second wall is solid so as to prevent the transfer of air therethrough, and wherein the first wall and the second wall are substantially aligned parallel to one another; and
a fan positioned downstream of the plenum channel, wherein when the fan is activated, unheated air is drawn through the bypass channel and across the I/O module and wherein the activation of the fan causes negative pressure to exist in the plenum channel, causing air to flow across the I/O module and into the plenum channel.

17. The chassis for a computing system of claim 16, wherein the activation of the fan causes heated air to be received at the plenum channel.

18. The chassis for a computing system of claim 16, wherein the first wall and the second wall are coupled by a third wall.

19. The chassis for a computing system of claim 16, wherein the chassis includes a barrier positioned between the processor module and the I/O module to prevent air from exiting the chassis without passing through the I/O module.

* * * * *